J. J. L. SMITS.
SCREEN.
APPLICATION FILED MAR. 26, 1915.
1,194,250.
Patented Aug. 8, 1916.
2 SHEETS—SHEET 1.
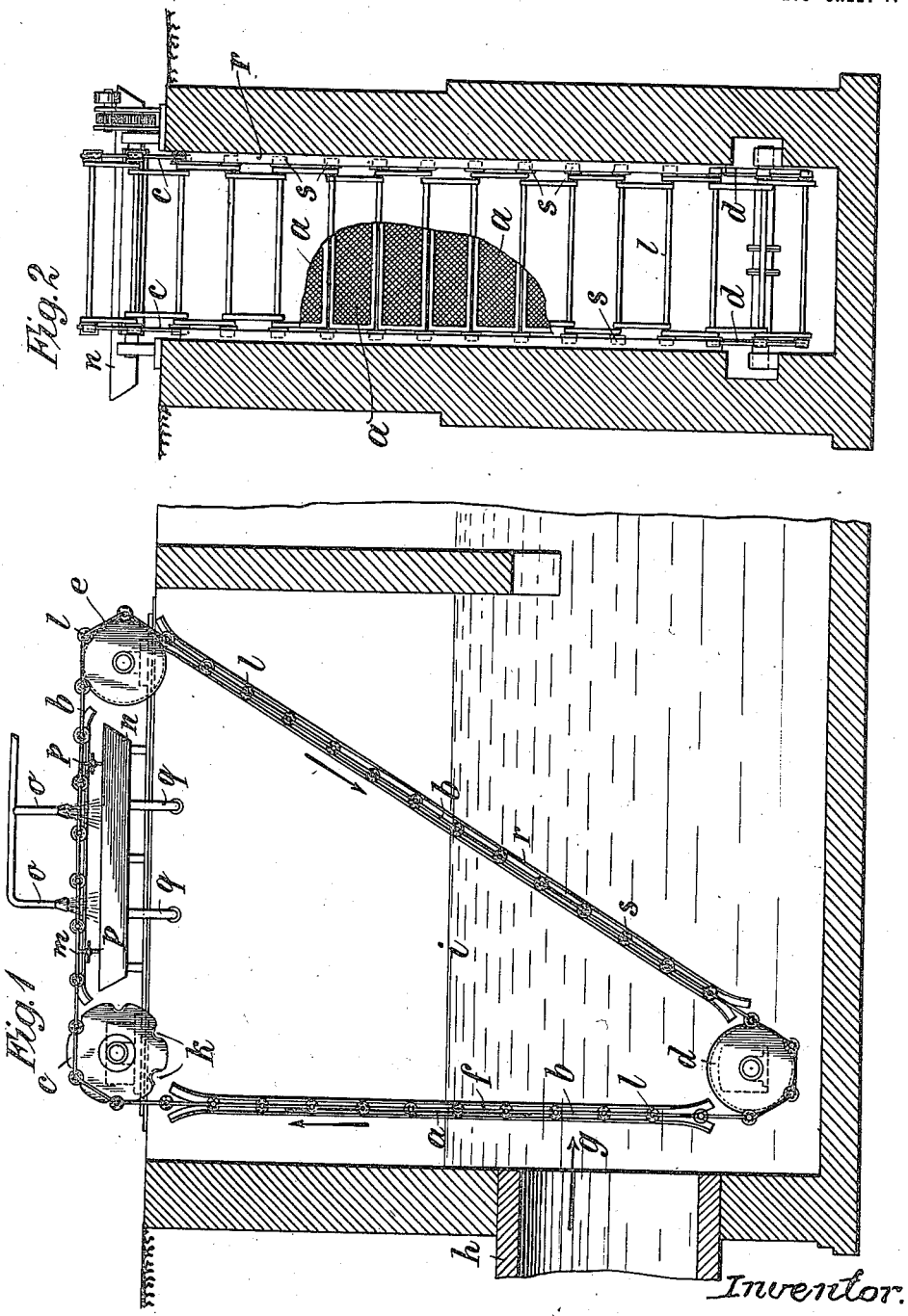
Inventor.
Jacob Joseph Louis Smits,
By His Attorneys
Howson & Howson

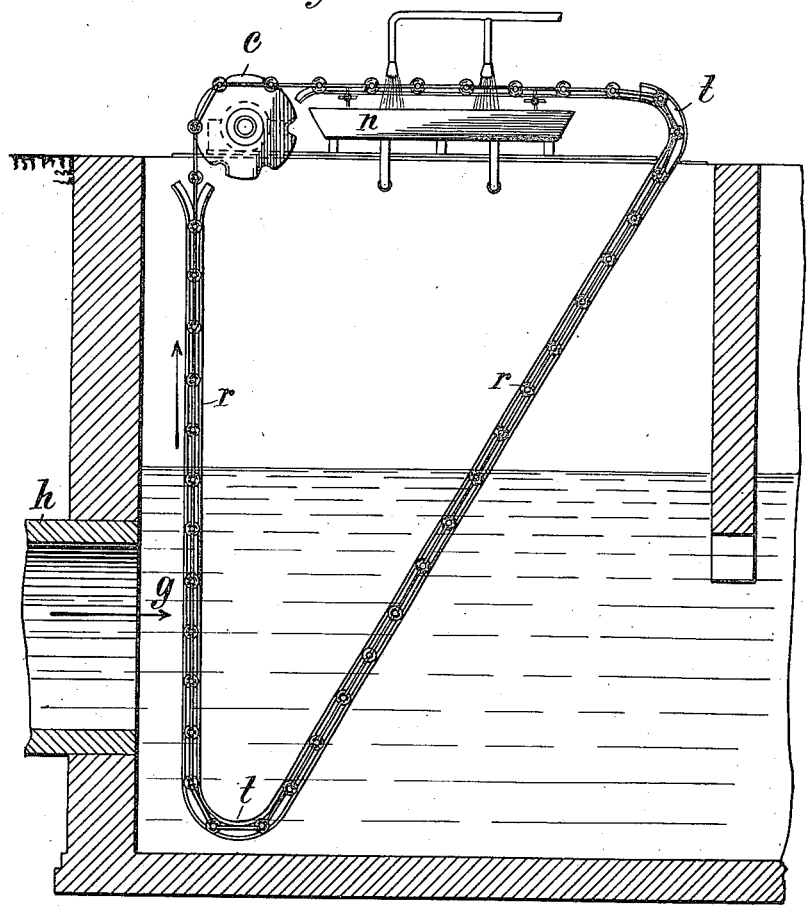
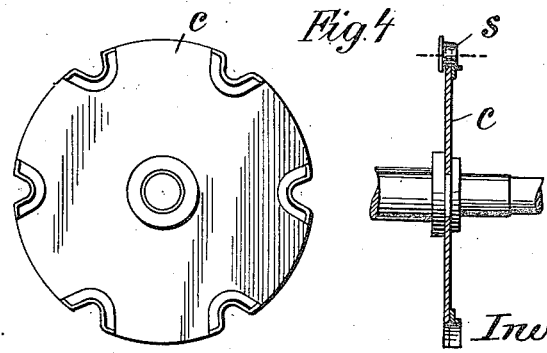

UNITED STATES PATENT OFFICE.

JACOB JOSEPH LOUIS SMITS, OF UTRECHT, NETHERLANDS.

SCREEN.

1,194,250.   Specification of Letters Patent.   Patented Aug. 8, 1916.

Application filed March 26, 1915. Serial No. 17,267.

*To all whom it may concern:*

Be it known that I, JACOB JOSEPH LOUIS SMITS, a subject of the Queen of the Netherlands, residing at 3 Willem de Zwygerstraat, Utrecht, Netherlands, have invented certain new and useful Improvements in Screens; and I do hereby declare the following to be a full, clear, and exact description of the invention.

My invention relates to screens and particularly endless traveling screens, the object of my invention being to provide an efficient device of this character in which the endless screen comprises a plurality of screen sections mounted on an endless chain, belt or like carrier and traveling over rollers, drums or the like. Such a screen may be used to advantage for purifying water used in engines, condensing plants, etc.

According to my invention the screen may be traveled without interrupting the flow of liquid therethrough, and the working portion of the screen lifted out of the liquid into position to be cleansed while a fresh portion of the screen simultaneously moves into working position. If the screen is thus traveled continuously or intermittently at suitable intervals, the mesh of the screen may, without danger of clogging, be made much finer than is possible where a stationary screen is used, which must remain in position for several days, since the portion of the screen which is out of the liquid is cleansed and returns, with its meshes unobstructed, into working position. Moreover, it is possible to replace defective screen sections in the unsubmerged portion of the apparatus without interrupting the operation of the latter. Again, the apparatus is more efficient since the fine mesh of the screen sections effects a much more complete removal of impurities from the water or other liquid in which the screen operates.

In the accompanying drawings Figure 1 is a side elevation of my novel screen with parts in section and Fig. 2 is an end elevation, and Fig. 3 an altered construction; Fig. 4 is a detail view.

$a$ denotes grid- or screen-elements mounted on endless chains or belts $b$ which travel over rollers $c$, $d$, $e$.

$f$ denotes the part of the screen situated between the rollers $c$ and $d$ and which is operative.

$g$ denotes the stream of cooling-water to be purified; $h$ denotes the duct leading this water to the screen and through this screen into the well $i$.

$k$ denotes grooves on the roller $c$ in which the axles $l$ of the endless chain $b$ or little rollers fastened on these axles are caught in order to cause the traveling of the screen when this roller $c$ is rotated by a handle, a motor or by any other suitable means.

$m$ denotes the inoperative part of the screen between the rollers $c$ and $e$; $n$ denotes a trough beneath this part $m$; $o$ denotes water jets and $p$ scrapers for removing the impurities from the screen, while $q$ denotes sludge pipes for the impurities. These impurities are washed off the screen part $m$ by the water jets $o$ and scraped off by the scrapers $p$; they fall down into the trough $n$ and flow away by the sludge pipes $q$.

On the way between the rollers $e$ and $c$ any defective screen-element $a$ can be easily removed and replaced, while the part $f$ of the screen remains operative.

On the way between the rollers $e$—$d$, and $d$—$c$ the screen-elements are guided by lateral guides $r$. For this purpose little rollers $s$ may be arranged on the axles $l$ of the endless chain $b$ which rollers work in the guides $r$.

When the screen is in constant motion its operative elements continuously change, i. e. fresh and cleansed elements constantly move vertically through the stream of water $g$ and take the place of others which are already loaded with impurities; in this way a very effective purification of the water is obtained.

In the construction according to Fig. 3 of the drawings the guiding rollers $d$ and $e$ are removed and replaced by guide-parts $t$.

I claim as my invention:

1. An endless traveling screen partially submerged, guide means for maintaining the submerged reaches of the screen in V-shape, and the unsubmerged reach between the upper ends of the submerged reaches in substantially horizontal position above the latter, in combination with means acting on the said horizontal reach of the screen to cleanse the latter before resubmersion.

2. An endless traveling screen, partially submerged, marginal guides therefor arranged at an angle to each other and at least partially submerged to maintain the submerged portion of the screen in V-shape, a portion of the screen not submerged having a substantially horizontal travel and means acting on the latter portion of the screen to cleanse the latter before resubmersion.

3. An endless traveling screen partially submerged and guide means for maintaining said screen in substantially triangular shape with two sides of the triangle partially submerged and the third side unsubmerged and substantially horizontal, for the purposes specified.

4. An endless traveling screen partially submerged, comprising an endless carrier element, divergent guides engaging the same in the submerged area of the screen and guide means to support said carrier element between the divergent guides.

In testimony whereof I have signed my name to this specification, in the presence of two subscribing witnesses.

JACOB JOSEPH LOUIS SMITS.

Witnesses:
  HENRY HASPER,
  WOLDEMAR HAUPT.